(12) United States Patent
Shirakawa

(10) Patent No.: US 10,327,428 B2
(45) Date of Patent: Jun. 25, 2019

(54) FISHING LURE

(71) Applicant: DRT INC., Otsu-shi, Shiga (JP)

(72) Inventor: Tomoya Shirakawa, Otsu (JP)

(73) Assignee: DRT INC., Otsu (JP)

( * ) Notice: Subject to any disclaimer, the term of this patent is extended or adjusted under 35 U.S.C. 154(b) by 331 days.

(21) Appl. No.: 14/778,160

(22) PCT Filed: Jan. 9, 2015

(86) PCT No.: PCT/JP2015/050454
§ 371 (c)(1),
(2) Date: Sep. 18, 2015

(87) PCT Pub. No.: WO2015/105170
PCT Pub. Date: Jul. 16, 2015

(65) Prior Publication Data
US 2016/0270380 A1    Sep. 22, 2016

(30) Foreign Application Priority Data
Jan. 9, 2014    (JP) .................................. 2014-002272

(51) Int. Cl.
*A01K 85/18*    (2006.01)
*A01K 85/16*    (2006.01)
*A01K 85/00*    (2006.01)

(52) U.S. Cl.
CPC .............. *A01K 85/18* (2013.01); *A01K 85/00* (2013.01); *A01K 85/16* (2013.01)

(58) Field of Classification Search
CPC ......... A01K 85/18; A01K 85/16; A01K 85/00
USPC ....................... 43/42.15, 42.47, 42.45, 42.48
See application file for complete search history.

(56) References Cited

U.S. PATENT DOCUMENTS

| 781,794 | A | * | 2/1905 | Smith | .................... | A01K 85/16 |
| | | | | | | 43/42.03 |
| 956,872 | A | * | 5/1910 | Alger | ..................... | A01K 85/16 |
| | | | | | | 43/42.16 |
| 974,050 | A | * | 10/1910 | Garrison | ................ | A01K 85/16 |
| | | | | | | 43/26.2 |
| 1,088,475 | A | * | 2/1914 | Stewart | .................. | A01K 85/16 |
| | | | | | | 43/42.09 |

(Continued)

FOREIGN PATENT DOCUMENTS

| FR | 2254274 A1 * | 7/1975 | ............. A01K 85/16 |
| FR | 2422328 A1 * | 11/1979 | ............. A01K 85/16 |

(Continued)

OTHER PUBLICATIONS

Translation of JP 2006-6199.*

(Continued)

*Primary Examiner* — Darren W Ark
(74) *Attorney, Agent, or Firm* — Oliff PLC

(57) ABSTRACT

A fishing lure includes a fish-shaped body in a shape of fish and a tail-fin member provided to a rear end of the fish-shaped body. An eye member to which a fishing line is tied is provided to a front end of the fish-shaped body. A lip member is provided at a front part of the fish-shaped body. The tail-fin member is horizontally provided to the fish-shaped body. It is preferable that the tail-fin member be attached to a rear end of the fish-shaped body so as to be freely swingable within a predetermined angle range about an axis extending in a front-rear direction.

6 Claims, 7 Drawing Sheets

(56) References Cited

U.S. PATENT DOCUMENTS

| | | | | |
|---|---|---|---|---|
| 1,150,635 A * | 8/1915 | Shakespeare, Jr. | A01K 85/16 | 43/42.08 |
| 1,188,583 A * | 6/1916 | Townsend | A01K 85/16 | 43/42.16 |
| 1,320,804 A * | 11/1919 | Squarebriggs | A01K 91/08 | 43/42.47 |
| 1,345,600 A * | 7/1920 | Keeling | A01K 85/16 | 43/42.47 |
| 1,590,529 A * | 6/1926 | Larzelere | A01K 85/16 | 43/42.37 |
| 1,948,823 A * | 2/1934 | Lissy | A01K 85/16 | 43/42.13 |
| 1,997,900 A * | 4/1935 | Waldo Edwards Ralph | A01K 85/16 | 43/42.15 |
| 2,013,898 A * | 9/1935 | Ridenour | A01K 85/16 | 43/42.09 |
| 2,159,591 A * | 5/1939 | Leusch | A01K 85/16 | 43/42.23 |
| 2,183,849 A * | 12/1939 | Swanberg | A01K 85/16 | 43/42.35 |
| 2,246,413 A * | 6/1941 | Haselwood | A01K 85/16 | 43/42.35 |
| 2,450,253 A * | 9/1948 | Parnell, Sr. | A01K 85/16 | 43/42.06 |
| D154,109 S * | 6/1949 | Espey et al. | | 43/42.45 |
| 2,517,298 A * | 8/1950 | Gaylord | A01K 85/16 | 43/42.04 |
| 2,517,299 A * | 8/1950 | Gaylord | A01K 85/16 | 43/41 |
| 2,525,733 A * | 10/1950 | Suick | A01K 85/16 | 43/42.22 |
| 2,547,103 A * | 4/1951 | White | A01K 85/16 | 43/42.04 |
| 2,552,730 A * | 5/1951 | Miller | A01K 85/01 | 43/42.31 |
| 2,556,533 A * | 6/1951 | Graaten | A01K 85/18 | 280/DIG. 4 |
| 2,561,515 A * | 7/1951 | Keeler | A01K 85/16 | 43/42.22 |
| 2,570,338 A * | 10/1951 | Gambill | A01K 85/16 | 43/42.35 |
| 2,583,616 A * | 1/1952 | Waddell | A01K 85/16 | 43/42.48 |
| 2,585,783 A * | 2/1952 | Johnston | A01K 85/16 | 43/15 |
| 2,596,474 A * | 5/1952 | Espey | A01K 85/16 | 43/42.35 |
| 2,597,792 A * | 5/1952 | Hardy | A01K 85/18 | 43/42.15 |
| 2,600,437 A * | 6/1952 | Siepe | A01K 85/16 | 43/42.03 |
| D168,507 S * | 12/1952 | Heiner | | 43/42.48 |
| 2,674,060 A * | 4/1954 | Simmons | A01K 85/18 | 43/42.15 |
| 2,680,927 A * | 6/1954 | Napier | A01K 85/16 | 43/42.09 |
| 2,685,145 A * | 8/1954 | Dean | A01K 85/18 | 43/42.15 |
| 2,690,026 A * | 9/1954 | King | A01K 85/00 | 43/42.02 |
| 2,714,779 A * | 8/1955 | Heiner | A01K 85/16 | 43/42.23 |
| 2,755,592 A * | 7/1956 | Bocchino | A01K 85/16 | 43/42.22 |
| 2,760,294 A * | 8/1956 | Morrill, Jr. | A01K 85/16 | 43/42.27 |
| 2,764,836 A * | 10/1956 | Webber | A01K 85/16 | 43/42.31 |
| 2,765,571 A * | 10/1956 | Sinclair | A01K 85/16 | 43/42.34 |
| 2,775,839 A * | 1/1957 | Kuslich | A01K 85/16 | 43/42.03 |
| 2,821,043 A * | 1/1958 | Parker, Jr. | A01K 85/16 | 43/42.15 |
| 2,878,612 A * | 3/1959 | Netherton | A01K 85/16 | 43/42.31 |
| 2,910,799 A * | 11/1959 | Wentworth | A01K 85/16 | 43/42.02 |
| 2,922,245 A * | 1/1960 | Sandburg | A01K 85/16 | 43/42.06 |
| 2,946,149 A * | 7/1960 | Baker | A01K 85/02 | 43/42.18 |
| 2,984,928 A * | 5/1961 | Jenkins, Sr. | A01K 85/16 | 43/42.09 |
| 3,034,249 A * | 5/1962 | Hawks | A01K 85/16 | 43/42.15 |
| 3,137,959 A * | 6/1964 | Wernett | A01K 85/12 | 43/42.13 |
| 3,162,971 A * | 12/1964 | Gilliam | A01K 85/16 | 43/42.3 |
| 3,172,227 A * | 3/1965 | Mackey | A01K 85/18 | 43/42.09 |
| 3,218,750 A * | 11/1965 | Lewin | A01K 85/16 | 43/42.28 |
| 3,296,734 A * | 1/1967 | Johnson | A01K 85/18 | 43/42.09 |
| 3,371,444 A * | 3/1968 | Cox | A01K 85/16 | 43/42.22 |
| 3,438,144 A * | 4/1969 | Lincoln | A01K 85/18 | 43/42.06 |
| 3,494,065 A * | 2/1970 | Benttinen | A01K 85/16 | 359/515 |
| 3,550,304 A * | 12/1970 | Kuslich | A01K 85/18 | 43/42.15 |
| 3,570,166 A * | 3/1971 | Borton | A01K 85/18 | 43/42.03 |
| 3,805,436 A * | 4/1974 | Davis | A01K 85/16 | 43/42.35 |
| 3,879,882 A * | 4/1975 | Rask | A01K 85/16 | 43/42.28 |
| 4,182,067 A * | 1/1980 | Pfister | A01K 85/16 | 43/42.22 |
| 4,188,743 A * | 2/1980 | Nothdurft | A01K 85/18 | 43/42.15 |
| 4,471,556 A * | 9/1984 | Dworski | A01K 85/16 | 43/42.23 |
| 4,573,282 A * | 3/1986 | Rowe | A01K 85/18 | 43/42.15 |
| 4,581,841 A * | 4/1986 | Gish | A01K 85/16 | 43/26.2 |
| 4,640,042 A * | 2/1987 | Rowe | A01K 85/18 | 43/42.15 |
| 5,035,075 A * | 7/1991 | Pearce | A01K 85/18 | 43/26.2 |
| 5,115,592 A * | 5/1992 | Renaud | A01K 85/16 | 43/42.47 |
| 5,381,623 A * | 1/1995 | Crisp | A01K 85/02 | 43/42.43 |
| 5,490,347 A * | 2/1996 | Conley | A01K 85/16 | 43/42.39 |
| 5,560,143 A * | 10/1996 | Allen | A01K 85/16 | 43/42.47 |
| 6,243,982 B1 * | 6/2001 | Halterman, Jr. | A01K 85/00 | 43/42.2 |
| 6,385,896 B1 * | 5/2002 | Thomassin | A01K 85/16 | 43/42.03 |
| 6,631,581 B2 * | 10/2003 | Gomes | A01K 85/16 | 43/26.2 |
| 7,493,724 B1 * | 2/2009 | Peterson | A01K 85/00 | 43/42.03 |
| 8,099,899 B2 * | 1/2012 | Scott | A01K 85/18 | 43/42.03 |
| 8,230,639 B2 * | 7/2012 | Langer | A01K 85/00 | 43/42.11 |
| 9,609,853 B2 * | 4/2017 | Coniglio | A01K 85/16 | |
| 9,615,552 B2 * | 4/2017 | Budd | A01K 85/16 | |

(56) References Cited

U.S. PATENT DOCUMENTS

| | | | | |
|---|---|---|---|---|
| 10,076,105 B2 * | 9/2018 | Baird | ............ | A01K 85/00 |
| 2001/0049900 A1 * | 12/2001 | Peck | ............ | A01K 85/16 |
| | | | | 43/42.39 |
| 2002/0007583 A1 * | 1/2002 | Nelson | ............ | A01K 85/18 |
| | | | | 43/42.09 |
| 2002/0050090 A1 * | 5/2002 | Lloyd | ............ | A01K 85/16 |
| | | | | 43/42.22 |

FOREIGN PATENT DOCUMENTS

| | | | | | |
|---|---|---|---|---|---|
| GB | 590865 | A | * | 7/1947 | ............ A01K 85/16 |
| JP | 09313071 | A | * | 12/1997 | |
| JP | H10-136835 | A | | 5/1998 | |
| JP | 2000295942 | A | * | 10/2000 | |
| JP | 2001161219 | A | * | 6/2001 | |
| JP | 2002281867 | A | * | 10/2002 | |
| JP | 2003047368 | A | * | 2/2003 | |
| JP | 2005218313 | A | * | 8/2005 | |
| JP | 2005348673 | A | * | 12/2005 | |
| JP | 2005348687 | A | * | 12/2005 | |
| JP | 2006006199 | A | * | 1/2006 | |
| JP | 2006042633 | A | * | 2/2006 | |
| JP | 2006115774 | A | * | 5/2006 | |
| JP | 2006197877 | A | * | 8/2006 | |
| JP | 2007020446 | A | * | 2/2007 | |
| JP | 2007053956 | A | * | 3/2007 | |
| JP | 2008118947 | A | * | 5/2008 | |
| JP | 2010022306 | A | * | 2/2010 | |
| JP | 2010-193801 | A | | 9/2010 | |
| JP | 2010193801 | A | * | 9/2010 | |
| JP | 2011092172 | A | * | 5/2011 | |
| JP | 2012-044972 | A | | 3/2012 | |
| JP | 2012044972 | A | * | 3/2012 | |
| JP | 2012-143214 | A | | 8/2012 | |
| JP | 2012143214 | A | * | 8/2012 | |
| JP | 2017051144 | A | * | 3/2017 | |
| RU | 2187224 | C2 | * | 8/2002 | |
| WO | WO-9742811 | A1 | * | 11/1997 | ............ A01K 85/16 |
| WO | WO-9937144 | A1 | * | 7/1999 | ............ A01K 85/16 |

OTHER PUBLICATIONS

Translation of JP 2010-22306.*
Translation of JP 2012-44972.*
Translation of JP 2005-348687.*
Translation of JP 2006-115774.*
Mar. 31, 2015 International Search Report issued in International Patent Application No. PCT/JP2015/050454.
Jan. 16, 2018 Office Action issued in Japanese Patent Application No. 2014-002272.

* cited by examiner

FISHING LURE

TECHNICAL FIELD

The present invention relates to a fishing lure (so-called artificial bait) used for fishing.

BACKGROUND

In recent years, lure fishing is widely done for fishing for fish (for example, black bass and the like) with fishing lures. In lure fishing, various kinds of lures are used depending on types of fish to fish for. For example, there are provided fishing lures in a shape of fish for black bass (see Japanese Patent-Application Publication No. 2012-44972, for example).

These fishing lures include a fish-shaped body formed of soft rubber or soft resin, and a front end of the fish-shaped body is embedded with a metal coil through which a hook (so-called, fishhook) is passed from up to down. Also, a tail-fin member is integrally formed at a rear end of the fish-shaped body, and a back-fin member is integrally formed at a back of the fish-shaped body.

SUMMARY

Problems to be Solved by the Invention

In the above-described conventional fishing lures, the fish-shaped body itself is formed to resemble an outer shape of fish, and the tail-fin member is provided in an up-down direction at the rear end of the fish-shaped body, and there are following problems.

Generally, carnivorous fish like black bass snap at a fishing lure in mistake for fish. Thus, moving a fishing lure like swimming fish attracts fish to bite, making it possible to catch fish (black bass, for example) easily.

For example, when reeling up, a fishing lure is pulled and moved together with a fishing line. When reeling up slowly, the fishing lure looks like fish swimming slowly. When reeling up fast, the fishing lure looks like fleeing fish swimming fast. These movements make fish bite the fishing lure in mistake for live fish.

The conventional fishing lure, however, receives small resistance from the water in the up-down direction because the tail-fin member is provided in the up-down direction. Thus, reeling up fast in attempt to make the fishing lure look like fleeing fish makes the fishing lure jump out of the water, enabling fish to detect that the fishing lure is not fish, and fish would not bite such a fishing lure.

It is an object of the invention to provide a fishing lure prevented from jumping out of the water even when reeling up fast.

Means for Solving the Problems

In order to achieve the above and other objects, one aspect of the invention provides a fishing lure including a fish-shaped body in a shape of fish and a tail-fin member provided to a rear end of the fish-shaped body. An eye member is provided to a front end of the fish-shaped body, and a fishing line is tied to the eye member. A lip member is provided at a front part of the fish-shaped body, and the tail-fin member is horizontally provided to the fish-shaped body.

The tail-fin member is preferably attached so as to be freely swingable within a predetermined angle range relative to the fish-shaped body about a first axis extending in a front-rear direction.

Also, the tail-fin member preferably includes an attaching part attached to the fish-shaped body and a fin part extending rearward from the attaching part, and a regulation part is preferably provided to at least one side of the attaching part, the regulation part regulating the swing movement of the tail-fin member about the first axis by abutting the rear end of the fish-shaped body.

Also, the fin part of the tail-fin member is preferably inclined and extends downward toward the rear from a lower end of the attaching part.

Also, the fin part of the tail-fin member preferably extends both sides in a width direction of the fish-shaped body, and both side parts of the fin part are preferably inclined and extend upward toward the both sides in the width direction from a center part of the fin part.

Also, the fish-shaped body preferably includes a head part provided with the eye member and the lip member, and a tail part provided with the tail-fin member. The tail part is linked to the head part so as to be freely swingable within a predetermined range about a second axis extending in an up-down direction.

Further, the tail-fin member preferably includes an attaching part attached to the fish-shaped body and a fin part extending rearward from the attaching part. The fin part preferably extends both sides in a width direction of the fish-shaped body. The tail-fin member is preferably selectively attached to the fish-shaped body in one of a first mounting state and a second mounting state. In the first mounting state, both side parts of the fin part are preferably inclined and extend upward toward the both sides in the width direction from a center part of the fin part, and in the second mounting state, the both side parts are preferably inclined and extend downward toward the both sides in the width direction from the center part.

Effects of the Invention

According to the fishing lure described above, because the tail-fin member is horizontally provided to the fish-shaped body, the resistance of the tail-fin member prevents the fish-shaped body from jumping out of the water even when the user quickly moves the fishing lure by reeling up quickly. Thus, reeling up quickly, for example, can make the fishing lure look like quickly fleeing fish. The fishing lure moving like this looks like real fish to carnivorous fish (for example, black bass), providing a fishing lure that can catch carnivorous fish easily.

Also, because the tail-fin member is attached to the fish-shaped body so as to be freely swingable within the predetermined angle range about the first axis extending in the front-rear direction, rolling of the fish-shaped body is suppressed when the user moves the fishing lure by reeling up, making it possible to make the fishing lure look like real fish swimming.

Also, the tail-fin member includes the attaching part attached to the fish-shaped body and the fin part extending rearward from the attaching part, and the regulation part is provided to at least one side of the attaching part. Thus, the tail-fin member swings in a range between an angle where the upper part of the regulation part abuts the fishing lure and an angle where the lower part thereof abuts the fishing lure, and it is possible to reliably prevent the swing movement of the tail-fin member beyond the swing angle range.

Also, because the fin part of the tail-fin member is inclined and extends downward toward the rear from the lower part of the attaching part, the resistance of the fin part can make the movement of the fish-shaped body vigorous when the user reels up to move the fishing lure. Especially, when the fish-shaped body is configured to the head part and the tail part linked to each other so as to be freely swingable in the lateral direction about the up-down axis, the tail part vigorously moves in the lateral direction about the up-down direction, making it look like fish leaping vigorously. This attracts carnivorous fish (for example, black bass) to bite.

Also, the both sides of the fin part of the tail-fin member is inclined and extends upward toward the both side from the center part of the fin part, adequately suppressing the resistance when reeling up. This minimize the fatigue of the user reeling up.

Also, the head part and the tail part of the fish-shaped body are linked so as to be freely swingable within the predetermined range about the second axis. Thus, when the user reels up to move the fishing lure, the tail part moves in the lateral direction relative to the head part, making the fishing lure look like real fish moving.

Further, the tail-fin member of the fish-shaped body can be attached in one of the first mounting state, where both sides of the fin part are inclined and extend upward toward the both sides, and the second mounting state, where the both sides of the fin part are inclined and extend downward toward the both sides. Thus, it is possible to make the fish-shaped body do two-types of movement when the user reels up to move the fishing lure. Especially, if the fish-shaped body is configured of the head part and the tail part linked to be freely swingable in the lateral direction about the up-down direction, the resistance of the tail-fin member makes the head part and the tail part swing about the up-down axis in the first mounting state. On the other hand, in the second mounting state, the resistance of the tail-fin member is small, restricting the swing movement of the head part and the tail part. In this manner, it is possible to use as two types of filing lures.

EMBODIMENT

Figure 1:
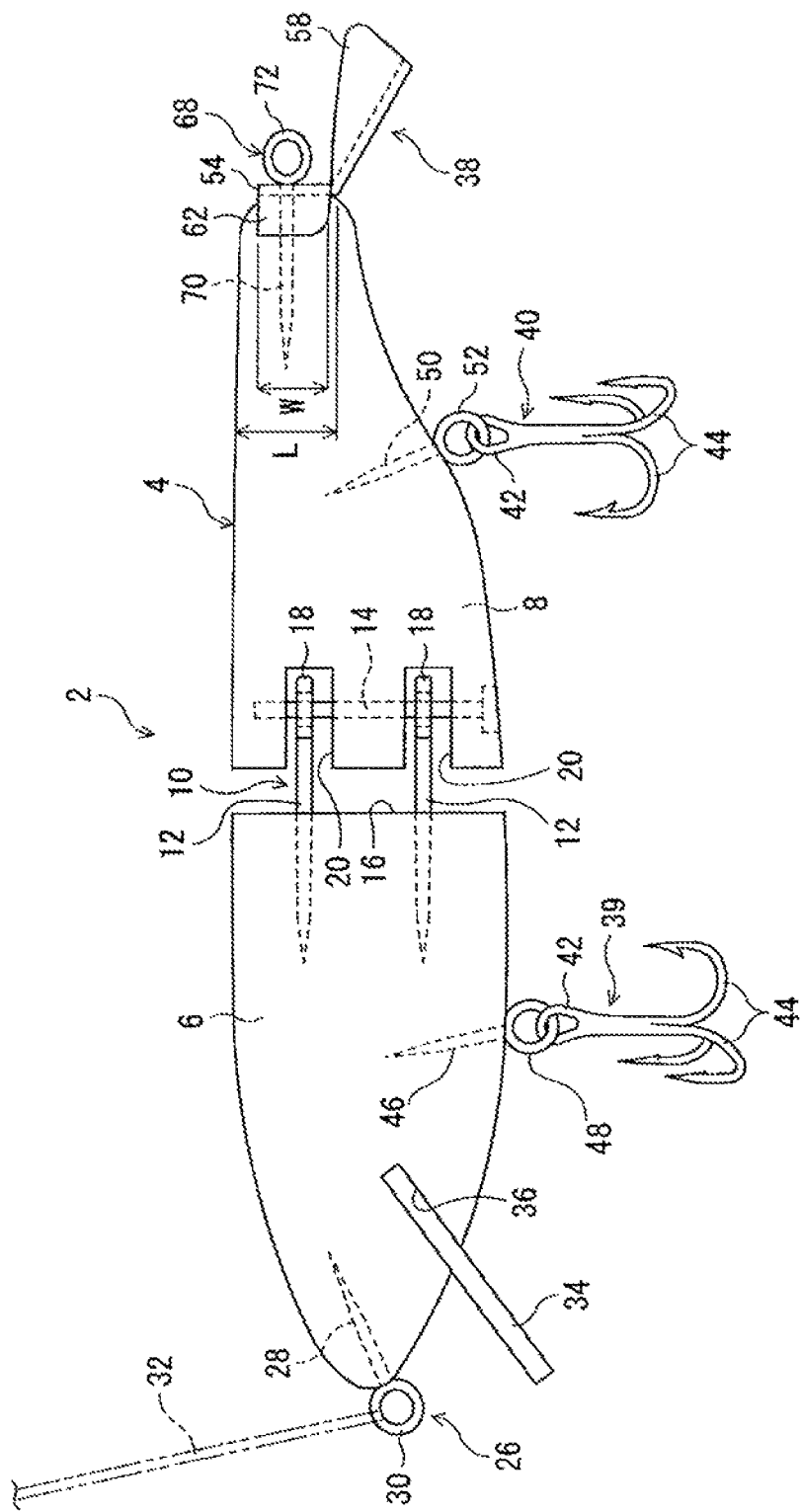
FIG. 1 A side view of a fishing lure according to an embodiment of the present invention.

A fishing lure according to an embodiment of the invention will be described while referring to the accompanying drawings. In FIG. 1, a fishing lure 2 (so-called, artificial bait) includes a fish-shaped body 4 in a shape of fish. The fish-shaped body 4 includes a head part 6, which is a front part of the fish-shaped body 4, and a tail part 8, which is a rear part thereof. The tail part 8 is linked to the head part 6 by a link mechanism 10 so as to be freely swingable within a predetermined range. The head part 6 and the tail part 8 may be formed of synthetic resin, woods, or the like, for example.

Figure 2:
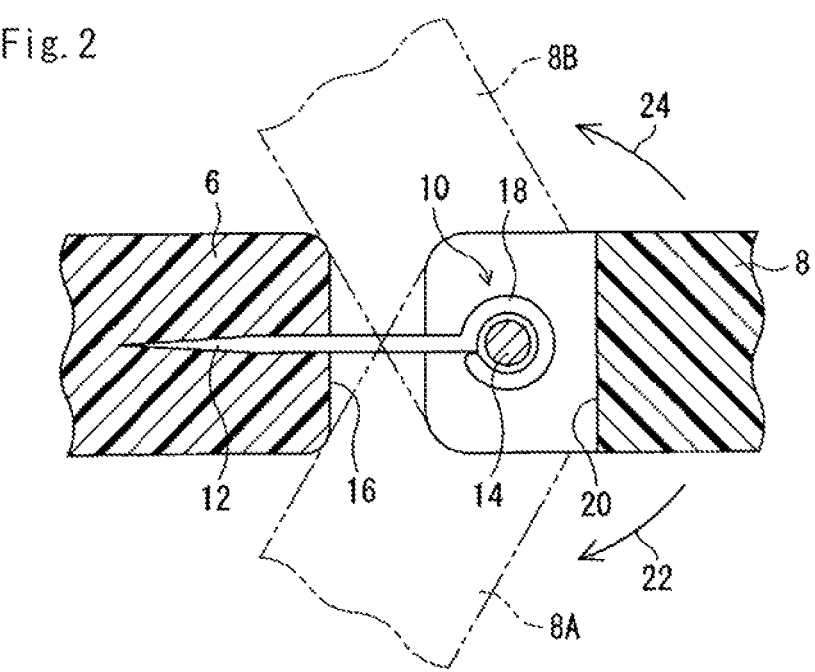
FIG. 2 A cross-sectional view showing a link structure between a head part and a tail part of the fishing lure of FIG. 1.
Figure 3:
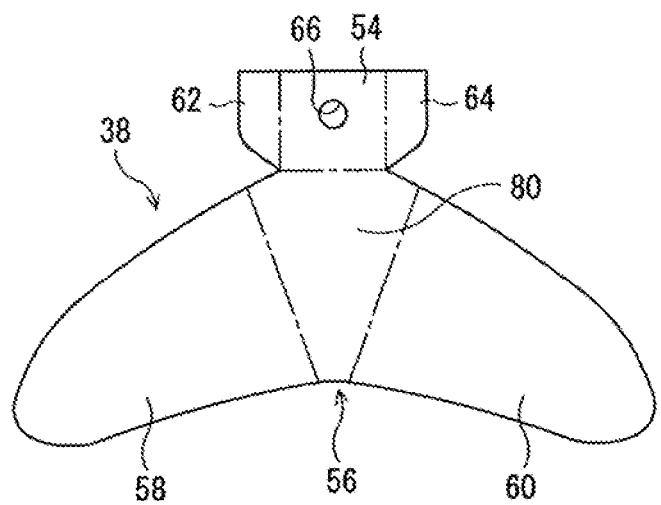
FIG. 3 A developed view showing a developed tail-fin member of the fishing lure of FIG. 1

With reference to FIG. 2 also, the link mechanism 10 includes a pair of link pins 12 provided to the head part 6 and a link screw 14 provided to the tail part 8. In this embodiment, the pair of link pins 12 is provided with an interval in an up-down direction (an up-down direction in FIG. 1, a direction perpendicular to a sheet surface of FIG. 2) at a rear surface 16 of the head part 6 such that front parts thereof are embedded in the head part 6. A ring-shaped link head 18 is provided on the rear side of each link pin 12. These link heads 18 protrude rearward from the head part 6. Also, a pair of receiving recesses 20 corresponding to the pair of link pins 12 is provided on the front side of the tail part 8 at an interval in the up-down direction.

The head part 6 and the tail part 8 are linked together as described next. That is, the pair of link pins 12 is attached to the rear surface 16 of the head part 6, and the link heads 18 of the link pins 12 are placed within the corresponding receiving recesses 20 of the tail part 8. In this state, the link screw 14 is inserted into the front part of the tail part 8 from a belly side to a back side through the link heads 18 of the pair of link pins 12.

In this linked state, the link screw 14 constitutes an up-down axis (a second axis) running in the up-down direction. The head part 6 and the tail part 8 are linked together so as to be freely swingable about the up-down axis. The tail part 8 is swingable between a left swing angle position 8A, where the tail part 8 abuts the left side of the rear end of the head part 6 by relatively swinging in a direction indicated by an arrow 22 (a clockwise direction in FIG. 2), and a right swing angle position 8B, where the tail part 8 abuts the right side of the rear end of the head part 6 by relatively swinging in a direction indicated by an arrow 24 (in a counterclockwise direction in FIG. 2). It should be noted that they may be linked together by providing the pair of link pins 12 to the front surface of the tail part 8, forming the receiving recesses in the rear end of the head part 6, and inserting the link screw 14 in the rear end of the head part 6 with the link heads 18 of the link pins 12 being positioned in the receiving recesses.

The front end of the head part 6 is provided with an eye member 26. In this embodiment, the front side of a fitting pin 28 is embedded in the front part of the head part 6, and a ring-shaped head part 30 of the fitting pin 28 functions as the eye member 26. A fishing line 32 from a reel (not shown) attached to a fish pole (not shown) is tied to the eye member 26, and a user can move the fishing lure 2 through the fishing line 32 by reeling up (or pulling the fish pole).

The head part 6 is also provided with a lip member 34. The lip member 34 is made of a synthetic resin plate or the like and fixed inside a slit 36 formed in a lower front part of the head part 6 by adhesive or the like. With the lip member 34 provided in this manner, when the user pulls the fishing line 32 (by reeling up, for example) to move the fishing lure 2, the fish-shaped body 4 moves in the water due to the resistance of the water acting on the lip member 34, and the head part 6 moves right and left, making the fishing lure 2 look like moving fish. Especially, because the head part 6 and the tail part 8 are linked together by the link mechanism 10 so as to be freely swingable, the resistance of the water acts on the tail part 8 also, due to the movement of the head part 6. Thus, the tail part 8 swings relative to the head part 6 within the predetermined range about the up-down axis (the link screw 14). As a result, it is possible to make the fishing lure 2 look like wiggling fish, making the movement of the fishing lure 2 closer to the movement of live fish.

Also, a tail-fin member 38 is provided horizontally to the rear part of the tail part 8. Providing the tail-fin member 38 horizontally in this manner makes it possible to prevent the fish-shaped body 4 from jumping out of the water even when the user reels up fast to move the fishing lure 2 quickly because of the resistance of the water acting on the tail-fin member 38. This makes the movement of the fishing lure 2 look like the movement of quickly fleeing fish. The tail-fin member 38 will be described later.

The fish-shaped body 4 is provided with two hooks 39, 40. The hooks 39, 40 have substantially the same configuration and each includes a ring-shaped link part 42 and three hook parts 44 extending from the ring-shaped link part 42 in a shape of letter "J." These hook parts 44 are disposed at an interval in a circumferential direction. In this embodiment, one hook 39 is provided to a lower front belly of the head part 6. The ring-shaped link part 42 of the hook 39 is linked to a ring part 48 of a fitting pin 46 attached to the lower front belly. Also, the other hook 40 is provided to a lower rear belly. The ring-shaped link part 42 of the hook 40 is linked to a ring part 52 of a fitting pin 50 attached to the lower rear belly. These hooks 39, 40 may be those well known in the art.

Figure 7:
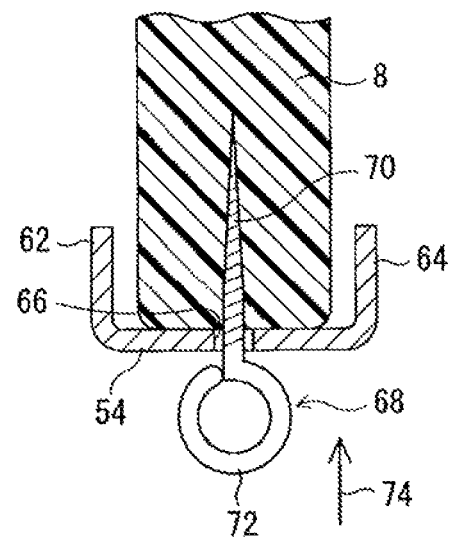
FIG. 7 A cross-sectional view of an attaching structure of the tail-fin member in the fishing lure of FIG. 1.

Next, with reference to FIGS. 1 and 3 to 7, the tail-fin member 38 and configuration relating thereto will be described. The tail-fin member 38 includes an attaching part 54 attached to the rear end of the tail part 8 and a fin part 56 extending rearward from the attaching part 54. The fin part 56 has a center part 80, and also a left side part 58 and a right side part 60 (both side parts) extending both sides from the center part 80. The attaching part 54 is provided with a left regulation part 62 and a right regulation part 64 at the both side parts. As shown in FIGS. 1 and 7, these left and right regulation parts 62, 64 are provided to extend forward at both sides of the tail part 8.

The tail-fin member 38 is attached to the rear surface of the tail part 8 by a fitting pin 68 in a manner described next. The fitting pin 68 has a screw part 70 on its front side and a ring-shaped head part 72 on its rear side. The tail-fin member 38 is attached to the tail part 8 by screwing the screw part 70 of the fitting pin 68 into the tail part 8 through a through hole 66 of the attaching part 54 of the tail-fin member 38.

The tail-fin member 38 can be one of a first mounting state and a second mounting state depending on a screwing state of the fitting pin 68. In the first mounting state (see FIG. 1) where the ring-shaped head part 72 of the fitting pin 68 presses against the attaching part 54 of the tail-fin member 38 (that is, the fitting pin 68 is tightly screwed), the attaching part 54 is sandwiched between the rear surface of the tail part 8 and the ring-shaped head part 72 of the fitting pin 68 and fixedly attached. Thus, the tail-fin member 38 does not swing relative to the tail part 8. On the other hand, in the second mounting state (see FIG. 7) where a small gap is formed between the ring-shaped head part 72 of the fitting pin 68 and the attaching part 54 of the tail-fin member 38 (that is, the fitting pin 68 is slightly loosely screwed to form the gap), the attaching part 54 does not fixedly sandwiched between the tail part 8 and the ring-shaped head part 72 of the fitting pin 68, allowing the tail-fin member 38 to swing relative to the tail part 8.

In the second mounting state, the tail-fin member 38 swings about the screw part 70 of the fitting pin 68 (the screw part 70 serves as a front-rear axis (first axis) extending in the front-rear direction (right-left direction in FIG. 1, up-down direction in FIG. 7). In order to regulate the swing movement of the tail-fin member 38 within the predetermined angle range, however, the fishing lure 2 is configured as follow. With reference to FIGS. 1 and 7 again, the left regulation part 62 of the tail-fin member 38 is disposed on the outside, slightly away from the left surface of the tail part 8, and the right regulation part 64 thereof is disposed on the outside, slightly away from the right surface of the tail part 8. In addition, a width W of the left and right regulation parts 62, 64 (width W in the up-down direction in FIG. 1) is set smaller than a length L of the rear end of the tail part 8 in the height direction (length L in the up-down direction in FIG. 1) (W<L).

With this configuration, when viewed from the rear side of the fish-shaped body 4 (i.e., in a direction indicated by an arrow 74 in FIG. 7), the swing movement of the tail-fin member 38 in the clockwise direction is regulated by the upper end of the left regulation part 62 abutting the left surface of the tail part 8 or the lower end of the right regulation part 64 abutting the right surface of the tail part 8. In this manner, the swing movement of the tail-fin member 38 in the clockwise direction beyond the angle position is prevented. Also, the swing movement of the tail-fin member 38 in the counter-clockwise direction is regulated by the lower end of the left regulation part 62 abutting the left surface of the tail part 8 or the upper part of the right regulation part 64 abutting the right surface of the tail part 8. In this manner, the swing movement of the tail-fin member 38 in the counter-clockwise direction beyond the angle position is prevented. Providing the left and right regulation parts 62, 64 in this manner enables the tail-fin member 38 to freely swing about the front-rear axis within the predetermined angle range.

With the tail-fin member 38 that is freely swingable in this manner, when the user moves the fishing lure 2 by reeling up, for example, the resistance of the water acting on the left and right side parts 58, 60 of the fin part 56 is suitably balanced, suppressing rolling of the fish-shaped body 4. In addition, when the tail part 8 largely swings relative to the head part 6 about the up-down axis, the resistance of the water acting on the left and right side parts 58, 60 of the fin part 56 fluctuates. This fluctuation of the resistance functions to suppress the relative swing movement of the tail part 8 about the up-down axis, making the movement of the fish-shaped body 4 look like real fish.

The tail-fin member 38 may be made of synthetic resin, metal plate, woods, or the like. In order to make an inclination angle of the fin part 56 and/or an inclination angle of the left and right side parts 58, 60 of the fin part 56 adjustable, it is preferable that the tail-fin member 38 be made of metal plate (stainless metal plate, for example).

Figure 4:
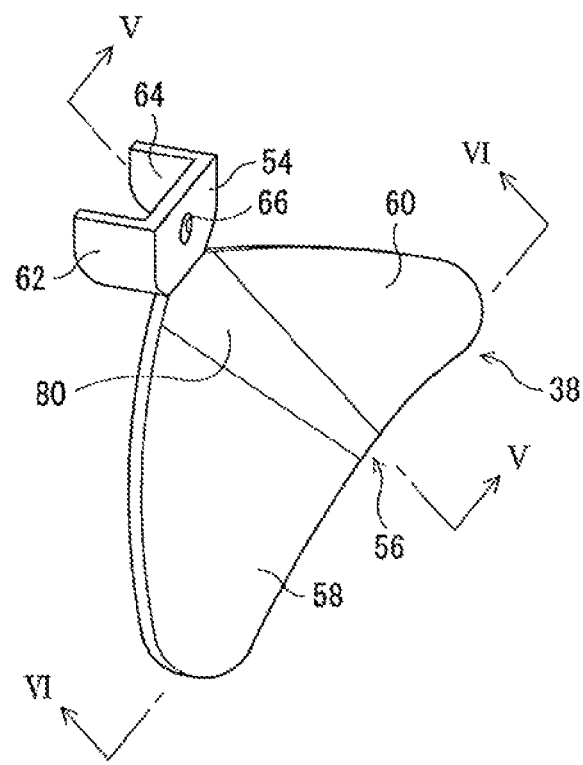
FIG. 4 A perspective view of the tail-fin member of the fishing lure of FIG. 1.
Figure 5:
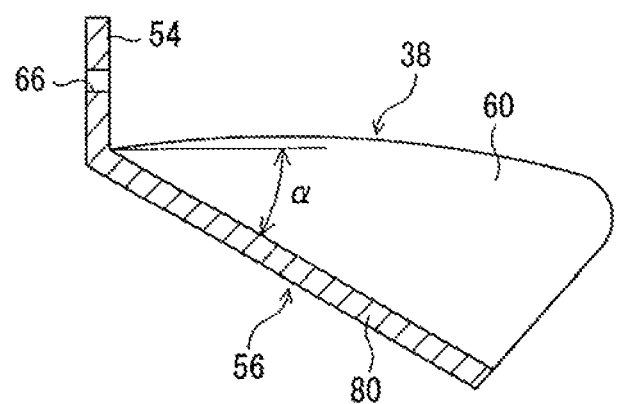
FIG. 5 A cross-sectional view of the tail-fin member taken along a V-V line of FIG. 4.
Figure 6:
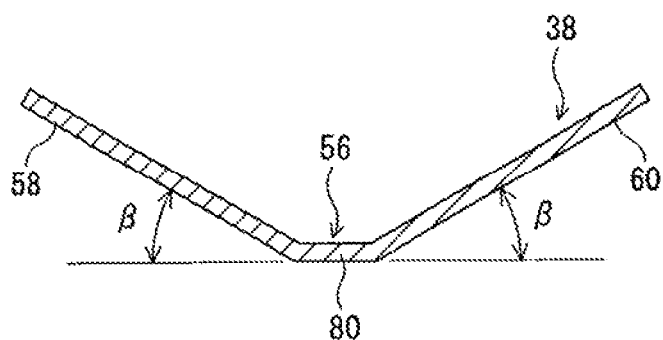
FIG. 6 A cross-sectional view of the tail-fin member taken along a VI-VI line of FIG. 4.

As shown in FIGS. 1, 4, and 5, the fin part 56 of the tail-fin member 38 preferably extends downward toward the rear in inclination from the lower part of the attaching part 54. An inclination angle $\alpha$ of the fin part 56 (inclination angle in the downward direction relative to a horizontal axis parallel to the front-rear axis) (see FIG. 5) is preferably set to 5 to 50 degrees (5 degrees$\leq \alpha \leq$50 degrees) and more preferably set to 10 to 35 degrees (10 degrees$\leq \alpha \leq$35 degrees). When the inclination angle $\alpha$ of the fin part 56 is large, the resistance of the water acting on the fin part 56 is large, making the fishing lure 2 move near the water surface. When the inclination angle $\alpha$ is small, the resistance of the water acting on the fin part 56 is small, making the fishing lure 2 move deep in the water. When the tail-fin member 38 is made of a metal plate, for example, the inclination angle $\alpha$ may be easily adjusted by deforming a base part of the fin part 56 (more specifically, a connection part between the attaching part 54 and the fin part 56).

As shown in FIGS. 1 and 4 to 6, the left and right side parts 58, 60 of the fin part 56 of the tail-fin member 38 are preferably configured to incline upward toward both sides from the center part 80. An inclination angle of the left and right side parts 58, 60 (inclination angle in the upward relative to the center part 80) (see FIG. 6) is preferably set to 10 to 50 degrees (10 degrees≤β≤50 degrees and more preferably set to 20 to 35 degrees (20 degrees≤β≤35 degrees). When the inclination angle β of the left and side parts 58, 60 is set large, the resistance of the water on the both side parts 58, 60 is small, and the rolling resistance of the fish-shaped body 4 is small. Thus, load that occurs when the user reels up to move the fishing lure 2 is small. When the inclination angle β is set large, the resistance of the water on the both side parts 58, 60 is large, and the rolling resistance of the fish-shaped body 4 is large. Thus, load that occurs when the user reels up to move it is large. When the tail-fin member 38 is made of a metal plate, for example, the inclination angle β can be easily adjusted by deforming a base part of the both side part 58, 60 (more specifically, connection parts between the center part 80 and the left and right side parts 58, 60) in the same manner as the base part of the fin part 56.

The tail-fin member 38 is also configured such that a width of the center part 80 of the fin part 56 (a width in the right-left direction, a length of a section between the left side part 58 and the right side part 60 in a width direction) becomes smaller from the attaching part 54 side toward its tip end. With this configuration, water smoothly flows rearward between the left side part 58 and the right side part 60 on the upper side of the fin part 56, stabilizing the tail-fin member 38.

When the fishing lure 2 is used, the fish-shaped body 4 is prevented from jumping out of the water even when the user moves the fishing lure 2 quickly, because the tail-fin member 38 attached to the rear end of the fish-shaped body 4 is provided horizontally. This makes it possible to make the movement of the fishing lure 2 look like the movement of quickly fleeing fish, attracting fish (especially, carnivorous fish like black bass) to bite.

The tail-fin member 38 may be attached to the tail part 8 by the fitting pin 68 in an upside-down state from the above-mentioned mounting state (first mounting state). In this mounting state (second mounting state), on the contrary to the above, the left regulation part 62 of the tail-fin member 38 is located outside of the right surface of the tail part 8, and the right regulation part 64 is located outside of the left surface of the tail part 8. Also, the fin part 56 of the tail-fin member 38 is inclined and extends upward toward the rear, and the both side parts 58 and 60 thereof are inclined and extend downward toward both sides.

In the second mounting state, the resistance of the water acting on the tail-fin member 38 moves the tail part 8 in the same manner as the head part 6. Although the head part 6 and the tail part 8 are linked to each other by the link mechanism 10 so as to be relatively swingable, they move as if integral with each other. The head part 6 and the tail part 8 may be used as an integrally-formed fish-shaped body. The fishing lure 2 may be used as two types of lures depending on the mounting state of the tail-fin member 38.

While the embodiment of the fishing lure according to the invention has been described, the invention is not limited to this embodiment, and various changes and modifications may be made therein without departing from the spirit of the invention.

For example, although the head part 6 and the tail part 8 are linked by the link mechanism 10 so as to be freely swingable in the above-described embodiment, the invention is not limited to this configuration. The link mechanism may be dispensed with, and the head part 6 and the tail part 8 may be formed integrally with each other.

Also, although the left and right regulation parts 62 and 64 are provided to the tail-fin member 38 in the above-described embodiment, the left and right regulation parts 62 and 64 are not necessarily provided. Providing only one of the left regulation part 62 and the right regulation part 64 can achieve the same effects as those described above.

Also, for example, the hooks 39 and 40 are attached to the head part 6 and the tail part 8 in the above-described embodiment. However, the invention is not limited to this configuration, but a hook (not shown) may be attached to the ring-shaped head part 72 of the fitting pin 68 for attaching the tail part 8 in addition to the hooks 39 and 40. Alternatively, a hook may be attached to the fitting pin 68 instead of the hook 40. One or a plurality of hooks may be attached to suitable parts of the fish-shaped body 4.

EXPLANATION OF REFERENCE NUMBERS 2 fishing lure
4 fish-shaped body
6 head part
8 tail part
10 link mechanism
26 eye member
34 lip member
38 tail-fin member
54 attaching part
56 fin part
58, 60 side part
62, 64 regulation part

What is claimed is:

1. A fishing lure comprising:
a body in a shape of a fish, the body having a front end and a rear end opposite to the front end in a longitudinal direction of the body, the body having an upper side, a lower side opposite to the upper side in a first direction perpendicular to the longitudinal direction of the body, a right side, a left side opposite to the right side in a second direction perpendicular to both the longitudinal direction and the first direction, and a belly located on the lower side;
an eye member provided at the front end of the body, the eye member being configured to be tied with a fishing line; and
a fitting pin attached to the belly; and
a tail-fin member provided at the rear end of the body and having a fin part, the fin part having a center part defining a center plane of the tail fin member and a first side part extending diagonally rearward toward the right side from the center part and a second side part extending diagonally rearward toward the left side from the center part, the first side part defining a first plane inclined with respect to the center plane, the second side part defining a second plane inclined with respect to the center plane, the tail-fin member being selectively attached to the body in one of a predetermined posture and a reverse posture in which the tail-fin member is reversed upside-down from the predetermined posture, wherein:
in the predetermined posture, the first side part having a first rear edge that extends upward toward the right side, the second side part having a second rear edge that extends upward toward the left side, the fin part having a rear edge formed by a least the first rear edge and the second rear edge, and the rear edge of the fin part forms a shape of a letter V as viewed from the rear end toward the front end in the longitudinal direction; and in the reverse posture, the rear edge of the fin part forms a shape of an inverted letter V as viewed from the rear end toward the front end in the longitudinal direction.

2. The fishing lure according to claim 1, wherein the fin part of the tail-fin member has a broad upper surface and a broad lower surface opposite to the broad upper surface in the first direction.

3. A fishing lure comprising:
   a body in a shape of a fish, the body having a front end and a rear end opposite to the front end in a longitudinal direction of the body, the body having an upper side, a lower side opposite to the upper side in a first direction perpendicular to the longitudinal direction of the body, a right side, a left side opposite to the right side in a second direction perpendicular to both the longitudinal direction and the first direction, and a belly located on the lower side;
   an eye member provided at the front end of the body, the eye member being configured to be tied with a fishing line;
   a fitting pin attached to the belly; and
   a tail-fin member provided at the rear end of the body, the tail-fin member including an attaching part attached to the body and a fin part extending rearward from the attaching part, the fin part having an undivided center part extending diagonally downward and rearward from the attaching part, the center part defining a center plane of the tail fin member, the fin part having a first side part extending diagonally rearward toward the right side from the center part and a second side part extending diagonally rearward toward the left side from the center part, the first side part defining a first plane inclined with respect to the center plane, the second side part defining a second plane inclined with respect to the center plane, the first side part having a first rear edge that extends upward toward the right side, the second side part having a second rear edge that extends upward toward the left side, the fin part having a rear edge formed by at least the first rear edge and the second rear edge, the rear edge being in a shape of a letter V from a perspective of the rear end of the body toward the front end of the body in the longitudinal direction.

4. The fishing lure according to claim 3, wherein a lip member is provided at the front end of the body.

5. The fishing lure according to claim 3, wherein the fin part of the tail-fin member has a broad upper surface and a broad lower surface opposite to the broad upper surface in the first direction.

6. The fishing lure according to claim 3, wherein the rear edge of the fin part is in a shape of the letter V from a perspective of the upper side of the body toward the lower side of the body in the first direction.

\* \* \* \* \*